(12) United States Patent
Jenkins et al.

(10) Patent No.: US 10,156,844 B1
(45) Date of Patent: Dec. 18, 2018

(54) SYSTEM AND METHOD FOR NEW EQUIPMENT CONFIGURATION AND SOUND MONITORING

(71) Applicant: Discovery Sound Technology, LLC, Nashville, TN (US)

(72) Inventors: John Jenkins, Nashville, TN (US); Jonathan Allan Harper, Nashville, TN (US)

(73) Assignee: Discovery Sound Technology, LLC, Nashville, TN (US)

( * ) Notice: Subject to any disclaimer, the term of this patent is extended or adjusted under 35 U.S.C. 154(b) by 98 days.

(21) Appl. No.: 15/436,773

(22) Filed: Feb. 18, 2017

Related U.S. Application Data

(63) Continuation-in-part of application No. 14/918,201, filed on Oct. 20, 2015, now Pat. No. 9,971,667, which
(Continued)

(51) Int. Cl.
*G06F 17/00* (2006.01)
*G05B 23/02* (2006.01)
(Continued)

(52) U.S. Cl.
CPC ......... *G05B 23/0224* (2013.01); *G06Q 10/20* (2013.01); *G06Q 30/0283* (2013.01)

(58) Field of Classification Search
CPC .. G06F 11/07; G06F 11/0751; G06F 11/3058; G06F 11/3072; G06F 11/3089;
(Continued)

(56) References Cited

U.S. PATENT DOCUMENTS 4,287,581 A 9/1981 Neale, Sr.
4,658,245 A 4/1987 Dye et al.
(Continued)

FOREIGN PATENT DOCUMENTS

WO 2012088707 A1 7/2012

OTHER PUBLICATIONS

N Tandon et al: "The Application of the Sound-Intensity Technique to Defect Detection in Roiling-Element Bearings", Applied Acoustics, Jan. 1, 1990 (Jan. 1, 1990), pp. 207-217, XP55402079, Retrieved from the Internet: URL:http://ac.els-cdn.com/0003682X9090019Q/1-s2.0-0003682XZ9090019Q-main.pdf?_tid=87d73c40-8cbd-11e7-a5d5-00000aacb35d&acdnat=1504013311_133ffbe3b260c5133178e57112c311c8.
(Continued)

*Primary Examiner* — Andrew C Flanders
(74) *Attorney, Agent, or Firm* — Patterson Intellectual Property Law, P.C.; Gary L. Montle

(57) ABSTRACT

A server-based system provides remote configuration of client electromechanical equipment and comparative analysis of sound data obtained therefrom. The server obtains equipment identification data from an endpoint device, and determines a confidence level of a suggested equipment configuration relative to various types of equipment having associated sound data files stored in a database. For sufficient matches (confidence levels exceeding a predetermined threshold value), the server associates the equipment with a selected one of the types of equipment, and conveys at least predetermined sound inspection positions to the endpoint device. A sound detection device is applied respective to the inspection points, wherein analog sound signals are collected from the equipment and converted into digital sound data. The digital data files are transmitted to the server and analyzed to identify data points representative of an elec-
(Continued)

tromechanical equipment failure, and to alert authorized users of potential failure and/or associated costs.

20 Claims, 7 Drawing Sheets

Related U.S. Application Data is a continuation-in-part of application No. 13/690,912, filed on Nov. 30, 2012, now Pat. No. 9,223,299.

(51) Int. Cl.
*G06Q 10/00* (2012.01)
*G06Q 30/02* (2012.01)

(58) Field of Classification Search
CPC .... G01M 1/22; G01M 13/028; G01M 13/045; H04R 29/00
See application file for complete search history.

(56) References Cited

U.S. PATENT DOCUMENTS

| | | | |
|---|---|---|---|
| 4,987,769 A | 1/1991 | Peacock et al. | |
| 5,103,675 A | 4/1992 | Komninos | |
| 5,432,755 A | 7/1995 | Komninos | |
| 5,436,556 A | 7/1995 | Komninos | |
| 5,445,026 A | 8/1995 | Eagan | |
| 5,710,377 A | 1/1998 | Youngquist et al. | |
| 5,854,422 A | 12/1998 | McKeon et al. | |
| 5,955,670 A | 9/1999 | Goodman et al. | |
| 6,057,959 A | 5/2000 | Taylor et al. | |
| 6,058,076 A | 5/2000 | Komninos | |
| 6,079,275 A | 6/2000 | Komninos | |
| 6,163,504 A | 12/2000 | Komninos et al. | |
| 6,175,934 B1 | 1/2001 | Hershey et al. | |
| 6,220,098 B1 | 4/2001 | Johnson et al. | |
| 6,247,353 B1 | 6/2001 | Battenberg et al. | |
| 6,295,510 B1 | 9/2001 | Discenzo | |
| 6,301,514 B1 | 10/2001 | Canada et al. | |
| 6,658,373 B2 | 12/2003 | Rossi et al. | |
| 6,666,093 B2 | 12/2003 | Morganti | |
| 6,701,725 B2 | 3/2004 | Rossi et al. | |
| 6,766,692 B1 | 7/2004 | Eagan | |
| 6,775,576 B2 | 8/2004 | Spriggs et al. | |
| 6,782,345 B1* | 8/2004 | Siegel | G06F 11/0733 |
| | | | 399/18 |
| 6,809,642 B1 | 10/2004 | Brenner | |
| 6,923,063 B2 | 8/2005 | Komninos | |
| 6,973,793 B2 | 12/2005 | Douglas et al. | |
| 6,978,675 B2 | 12/2005 | Eagan | |
| 7,016,742 B2 | 3/2006 | Jarrell et al. | |
| 7,051,577 B2 | 5/2006 | Komninos | |
| 7,079,967 B2 | 7/2006 | Rossi et al. | |
| 7,099,852 B2 | 8/2006 | Unsworth et al. | |
| 7,308,385 B2 | 12/2007 | Wegerich et al. | |
| 7,540,183 B2 | 6/2009 | Komninos | |
| 7,580,781 B2 | 8/2009 | Mindeman | |
| 7,603,586 B1 | 10/2009 | Skladanowski et al. | |
| 8,024,938 B2 | 9/2011 | Rossi et al. | |
| 8,245,576 B2 | 8/2012 | Komninos | |
| 8,468,874 B2 | 6/2013 | Komninos | |
| 8,495,914 B2 | 7/2013 | Izikoff | |
| 8,872,652 B2 | 10/2014 | Komninos | |
| 8,872,654 B2 | 10/2014 | Komninos | |
| 2002/0152056 A1 | 10/2002 | Herzog et al. | |
| 2004/0102928 A1 | 5/2004 | Cuddihy et al. | |
| 2004/0112136 A1* | 6/2004 | Terry | G01M 13/028 |
| | | | 73/572 |
| 2004/0136539 A1* | 7/2004 | Uhi | H04N 1/00002 |
| | | | 381/56 |
| 2004/0158474 A1 | 8/2004 | Karschnia et al. | |
| 2005/0096873 A1 | 5/2005 | Klein | |
| 2005/0126264 A1 | 6/2005 | Komninos | |
| 2006/0053867 A1 | 3/2006 | Stumpf | |
| 2006/0135907 A1 | 6/2006 | Remde et al. | |
| 2006/0164097 A1 | 7/2006 | Zhou et al. | |
| 2006/0265261 A1 | 11/2006 | Wetzer et al. | |
| 2007/0028693 A1 | 2/2007 | Komninos | |
| 2007/0109137 A1 | 5/2007 | Farrel | |
| 2007/0109138 A1 | 5/2007 | Farrell | |
| 2007/0112528 A1 | 5/2007 | Farrell | |
| 2008/0147356 A1 | 6/2008 | Leard et al. | |
| 2009/0091441 A1* | 4/2009 | Schweitzer, III | G01M 13/028 |
| | | | 340/531 |
| 2009/0196431 A1 | 8/2009 | Gregg | |
| 2010/0039271 A1 | 2/2010 | Izikoff et al. | |
| 2010/0067708 A1 | 3/2010 | Groth | |
| 2010/0097057 A1 | 4/2010 | Karpen | |
| 2010/0307860 A1 | 12/2010 | Ellingson | |
| 2011/0022346 A1 | 1/2011 | Rossi et al. | |
| 2011/0023585 A1 | 2/2011 | Izikoff | |
| 2011/0055669 A1 | 3/2011 | DeHaan et al. | |
| 2011/0074589 A1 | 3/2011 | Han et al. | |
| 2012/0035802 A1 | 2/2012 | Suzuki et al. | |
| 2012/0230482 A1 | 9/2012 | Gavillet | |
| 2013/0046714 A1* | 2/2013 | Harris | G01H 1/00 |
| | | | 706/12 |
| 2013/0063262 A1 | 3/2013 | Shaikh et al. | |
| 2013/0283890 A1 | 10/2013 | Komninos | |
| 2014/0114612 A1 | 4/2014 | Yoskovitz et al. | |
| 2016/0100265 A1* | 4/2016 | Maggiore | G01S 3/801 |
| | | | 381/56 |
| 2016/0100266 A1* | 4/2016 | Propp | H04R 29/00 |
| | | | 381/56 |
| 2016/0302019 A1* | 10/2016 | Smith | G01H 1/00 |

OTHER PUBLICATIONS

Rutter, Thomas A.: "Acoustic Analysis of Quiet Ball Bearing Failure Modes", Marine Technology, Apr. 1, 1979 (Apr. 1, 1979), pp. 181-188, XP5402240, Retrieved from the Internet: URL:http://www.sname.org/HigherLogic/System/DownloadDocumentFile.ashx?DocumentFileKey-d48eeb1c-6a0a-4083-b282-aa79ea0f0679 [retrieved on Aug. 30, 2017].

European Patent Office: Extended European Search Report re: Application No. 13858103.8, dated Jul. 5, 2016.

Ivan Polajnar et al: Sources of Acoustic Emission in Resistance Spot Welding, Nov. 6, 2008 (Nov. 6, 2008), XP055283415, Retrieved from the Internet: URL:http://citeseerx.ist.psu.edu/viewdoc/download?doi=10.1.1.216.5231&rep=rep1&type=pdf [retrieved Jun. 24, 2016].

Emielniak et al: "Catastrophic Tool Failure Detection Based on Acoustic Emission Signal Analysis", CIRP Annals, Elsevier BV, NL, CH, FR, vol. 47, No. 1, Jan. 1, 1998 (Jan. 1, 1998), pp. 31-34, XP022137426, ISSN: 0007-08506 (07) 62779-6.

Anonymous: "Outlier-=Wikipedia, the free encyclopedia", Nov. 8, 2012 (Nov. 8, 2012), XP055283665, Retrieved from the Internet: URL: https://en.wikipedia.org/w/index.php?title=Outlier&oldid=-521929459 [retrieved Jun. 27, 2016].

D. Rajendra et al: "A physically based classification approach for identifying AE source mechanism", Optical Sensing II, vol. 7648, Mar. 25, 2010 (Mar. 25, 2010), p. 76480Y, XP55283442, 1000 20th St. Bellingham WA 98225-6705 USA ISSN: 0277-786X, DOI: 10,.1117/12.847781 ISBN: 978-1-62841-971-9 *abstract*.

* cited by examiner

SYSTEM AND METHOD FOR NEW EQUIPMENT CONFIGURATION AND SOUND MONITORING

CROSS-REFERENCES TO RELATED APPLICATIONS

This application is a continuation-in-part of U.S. patent application Ser. No. 14/918,201, filed Oct. 20, 2015, which is further a continuation-in-part of U.S. patent application Ser. No. 13/690,912, filed Nov. 30, 2012 (now U.S. Pat. No. 9,223,299), both of which are hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to systems utilizing locally collected sound data corresponding to ultrasound emissions from distributed electromechanical equipment, and providing remote and centralized fault detection analysis. More particularly, embodiments of an invention as disclosed herein relate to systems for auto-generation of a new equipment configuration and associated inspection points based on make and model number matching algorithms and using extracted equipment configuration information from a hosted database.

Certain systems are conventionally known for the purpose of diagnosing electromechanical equipment in the field using ultrasound collection, for example in order to provide predictive maintenance services. However, it is generally inefficient to have highly trained technicians personally travel to each location in order to perform diagnostics. Mechanical contractors, service providers, and the like generally struggle to find and train qualified technicians, such that the availability for trained technicians is accordingly scarce, and efficient resource allocation is critical. Therefore, various systems have been implemented to locally collect sound data and engage a centrally located technician (i.e., remote with respect to the equipment itself) to manually diagnose the sounds of the equipment, or in some cases to even automate the diagnostics process based on stored data files corresponding to the sounds produced by the equipment.

In either case, it is important to have adequate knowledge regarding the equipment configuration. However, property equipment lists at both property managers/owners and HVAC service companies are not readily available. Alternative equipment lists tend to be incomplete and/or inaccurate, and the relevant information is difficult for inexperienced personnel to gather. Generally stated, identifying specific sub-components of a specific unit for configuration purposes requires scarce technical knowledge and is a time-consuming manual process. Examples of configuration information that may therefore be unavailable without the presence of experienced personnel onsite could include one or more of the equipment name, description, system type, make, model, serial number, and the like.

The lack of accurate knowledge regarding an equipment configuration can be more than a barrier to effective diagnostics, but may present a barrier in winning or maintaining business. Incomplete or incorrect data entered into a quote or otherwise describing equipment configuration may cause significant rework and potential loss of margin.

BRIEF SUMMARY OF THE INVENTION

Various systems and methods in accordance with the present disclosure may include a handheld data collection device, back-end software, and user interface tools collectively configured to enable even relatively inexperienced users technicians to collect data on distributed electromechanical equipment. Once uploaded, the data may be analyzed remotely (e.g., in the cloud) and results subsequently delivered to an endpoint device dashboard for real-time viewing and collaborative decision-making.

Systems as disclosed herein may implement databases including numerous model numbers and model components, around which clusters of common equipment configurations merge and may be identified through iterative compilation and analysis. Through the capture of correlations and relationships identified in accordance with these clusters, server-based programming may selectively analyze the data statistically and offer suggested configurations for new equipment added to the system via locally captured equipment data.

For example, a system as disclosed herein may simply receive equipment make and model numbers as inputs to a hosted server, and programmatically produce suggested configurations as an output to a user interface on an endpoint device, and may further provide the output along with a confidence level (typically stated as a percentage such as, e.g., from 80%-100%) of each suggested configuration.

An exemplary embodiment of a system is disclosed herein for remote configuration of client equipment and comparative analysis of sound data obtained therefrom. The system may include an endpoint device such as for example a tablet computer or smart phone, having a display unit for providing a user interface such as for example a browser or device-resident mobile application, and linked to a communications network. A hosted server is associated with one or more databases and linked to the endpoint device via the communications network. In an exemplary method of operation, the server obtains data from the endpoint device corresponding to client electromechanical equipment at a first location, and identifies one or more segments or groupings of model number codes that are resident in the obtained data, which may for example have a historical significance with respect to identifying one or more existing equipment configurations having baseline sound data similarities. The server determines a confidence level of a match for the electromechanical equipment relative to any one or more of a plurality of electromechanical equipment configurations having associated sound data files stored in the one or more databases. For determined confidence levels exceeding a predetermined threshold value, the server may associate the electromechanical equipment with a selected one of the plurality of equipment configurations, and identify one or more predetermined sound inspection positions associated with the selected one of the plurality of equipment configurations.

In one aspect of the aforementioned embodiment, the server may further convey the identified one or more predetermined sound inspection positions to the endpoint device. The system may further include a sound detection device comprising one or more transducers effective to collect analog sound signals from equipment and convert the collected sounds into digital sound data. A user can position the sound detection device in accordance with the predetermined sound inspection positions as received via the endpoint device, wherein the sound detection device generates one or more digital data files comprising at least the sound data.

The sound detection device may in various embodiments be a portable device, or may be fixed to the electromechanical equipment for continuous data generation upon identifying the sound inspection positions, or may even be the same as or part of the endpoint device.

In another aspect, the server may be linked to the sound detection device via a communications network and thereby able to receive digital data files from the sound detection device, corresponding to analog sound signals collected from the one or more predetermined sound inspection positions. Server-based processors and executable programming identify data points from the digital data files representative of an electromechanical equipment failure.

In another aspect, the server may determine the confidence level based on a determined relevance of identified segments or groupings of model number codes resident in the obtained data corresponding to the electromechanical equipment. The confidence level may still further be based on a relative weight of variables for one or more of the identified segments or groupings of model number codes resident in the obtained data, and having historical significance with respect to baseline sound data similarities.

In another aspect, the one or more databases associated with the server comprise iteratively compiled relationships associated with a specific set of one or more variables for the one or more identified segments or groupings of model number codes resident in the obtained data, and having historical significance in identifying one or more existing equipment configurations having baseline sound data similarities.

In another aspect, the endpoint device may include an imaging device such as for example a camera or a QR scanner, wherein the data corresponding to the electromechanical equipment at the first location is obtained from the endpoint device in the form of a captured one or more images, and wherein the server is configured to extract make and model information from the one or more images, for example via object recognition.

In yet another aspect, endpoint device may include one or more position sensors, wherein the data corresponding to the electromechanical equipment at the first location is obtained from a comparison of current geographic coordinates for the endpoint device with stored location data associated with electromechanical equipment in the one or more databases.

In yet another aspect, the server may be configured to generate a user interface on the display unit associated with the endpoint device that presents a list of selectable profile matches sorted by confidence level. The user may be enabled thereby to confirm the suggested or predicted configuration having a highest confidence level, or may for example manually override the suggested or predicted configuration, or manually select any one of a plurality of configuration options.

In still another aspect, the server may be further configured to generate an alert effective to notify a user of the failure or substandard operation of the electromechanical device by transmitting the alert via the communications network to an endpoint device associated with an authorized user.

Additionally, or in the alternative, in certain embodiments the server may be further configured to estimate a cost for maintenance of the electromechanical equipment based on identified data points from the sound data representative of equipment failure and expected equipment failure.

DETAILED DESCRIPTION OF THE INVENTION

Figure 1:
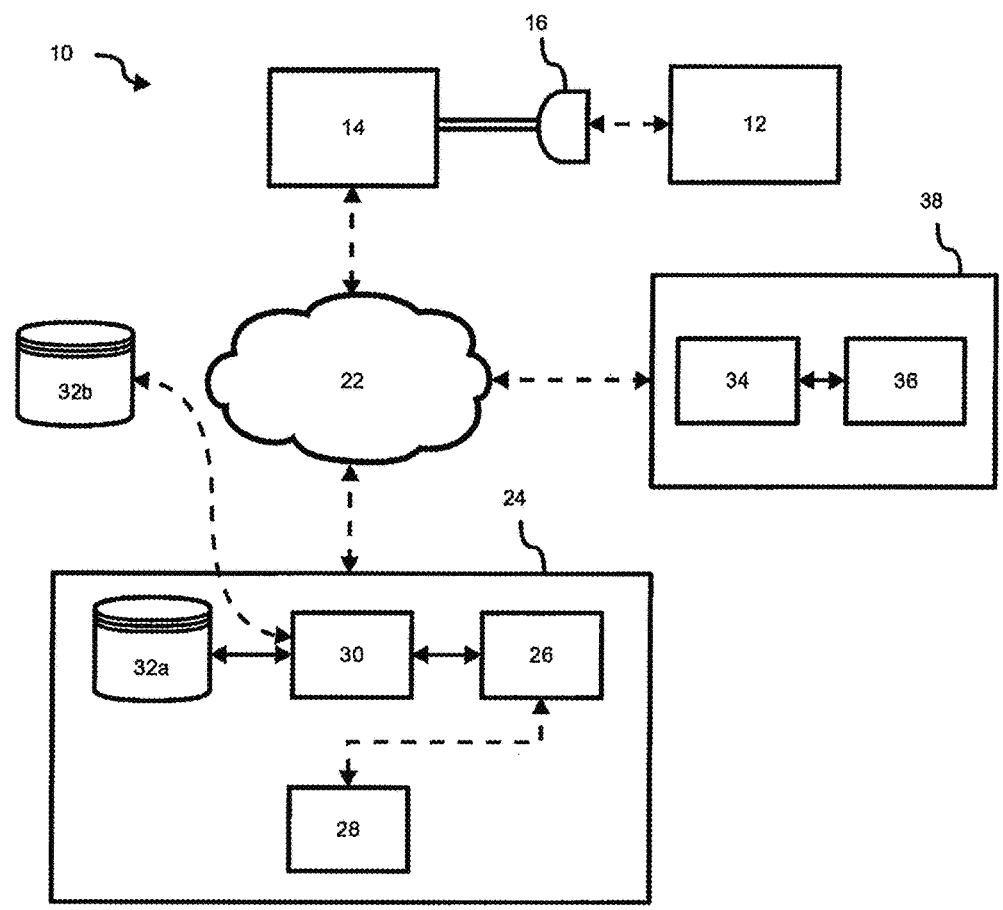
FIG. 1 is a block diagram representing an exemplary embodiment of a mobile diagnostic system for comparative analysis of sound data according to the present disclosure.

Referring generally to FIGS. 1-6, various exemplary embodiments may be described herein for a system and method for extrapolation of new equipment configuration, wherein sound data that is remotely collected from the equipment can be diagnosed to identify potential issues and/or costs based on known sound signatures for analogous electromechanical equipment. Where the various figures may describe embodiments sharing various common elements and features with other embodiments, similar elements and features are given the same reference numerals and redundant description thereof may be omitted below.

The terms "electromechanical device" or "electromechanical equipment" as interchangeably used herein are not limited in scope with respect to a particular field of use, but generally refer to electrical or electro-mechanical devices, components, or systems that generate or emit sound energy representative of flaw, excessive wear, and/or failure (e.g., creating measurable changes in air pressure based on changes in work intensity), and may typically include, without limitation, transformers, switching power converters, air compressors, boilers, chillers, air condensing units, cooling towers, pumps, motors, fans, piston compressors, reciprocal compressors, and the like.

Referring more particularly to FIG. 1, an embodiment of a system 10 according to the present disclosure includes an electromechanical device 12. A sound detection device 14 may be effective to receive at least analog sound signals from the electromechanical device and convert said signals into digital sound data. The sound detection device 14 is configured to generate one or more digital data files based upon the received sound signals, predefined parameters, or other variable inputs, such that the digital data files comprise the digital sound data, the type of electromechanical device 12 proximate to which the sound detection device 14 has been operatively positioned, and the location of the electromechanical device 12 or sound detection device 14.

In certain embodiments, the sound detection device 14 may further be able to transmit at least the digital sound data or the digital data files across a communications network 22 to a host server 24. In one embodiment, the sound detection device 14 may transmit digital data files across the Internet by means of a modem to an Internet-connected monitoring server 24. In an alternative embodiment, the sound detection device 14 may transmit digital data files on a local intranet network to a local host server 24. In an embodiment, the sound detection device 14 may include a user interface which can be manipulated by a user to initiate sound collection or transmittal to the hosted server.

In certain embodiments, a sound detection device 14 may be fixed with respect to individual pieces of equipment 12, for example at or proximate to an inspection point that has been identified for the respective equipment. Such sound detection devices 14 may be configured to continuously or periodically monitor, collect and store at least sound data from the associated equipment inspection point. The device 14 may be communicatively linked to the endpoint device 38 wherein a user interface associated with the endpoint device 38 can received and review data from the sound detection device 14, adjust settings, initiate data transfers, etc.

In a particular and exemplary embodiment, a sound detection device 14 may include an ultrasound measurement unit with a portable housing about or within which is disposed a flexible tube, a sound cup 16 on a distal end of the flexible tube relative to the housing, a display portion, user interface components such as buttons, dials, etc., and actuators such as for example a trigger-style button.

Generally stated, the sound detection device 14 may measure air pressure created from the intensity of the work at the source, rather than mere sound measurement. Sound is but a medium by which we can measure that work in a non-contact manner. One or more piezoelectric transducers disposed within the flexible tube are effective to receive analog ultrasound signals and convert the signals to electrical (digital) impulses that are then filtered and amplified by appropriate circuitry and digital logic components. The device 14 may generate sound data files based on the filtered and amplified digital impulse signals for internal measurement, conversion and display, and further for external transmission to a remote server 24 or other device for storage and analysis as further described below. Various embodiments of the device 14 may further or alternatively convert the filtered and amplified digital impulses back to analog signals for user examination of the represented sound data via for example earphones.

Since intensity is greatly affected by changes in angle and distance, another aspect of embodiments of the present invention is to provide a non-contact transducer as close to the source of the sound as possible. A sound cup 16 is coupled to the device 14 that creates a 1" standard measurement point from the source with as close to a zero degree angle as possible. This facilitates consistency of measurement from one source to another and 'pre-defines' the impacts of the loss of intensity due to distance. Additionally, the sound cup 16 may be made from materials that 'block' sound from sources other than the intended source of the sound, thus significantly improving the measurement of the intended source.

In an embodiment, the sound detection cup 16 may be placed in sequence at various inspection points relative to the one or more portions of the electromechanical device 12 such that sound produced by the electromechanical device 12 in operation and relative to that point may be detected by the sound detection device 14, the sound detection device 14 thereby generating digital data files in accordance with the analog sound signals received from each point.

In certain embodiments, the server 24 (or alternatively, a plurality of functionally and/or communicatively linked servers) may include or otherwise implement a computer-readable medium 26, a processor 30, and a database 32. In execution of a method according to the present invention, the server 24 may be linked to or otherwise access an external database 32*b* which may be associated with a remote data source in addition to any hosted or otherwise local database or databases 32*a* residing on or in association with the server(s) 24.

In certain embodiments, the processor 28 may execute software instructions 28 stored on the computer-readable medium 26 effective to receive the digital data files via the communications network 22 and store said digital data files in the database 32. The processor 28 may further execute software instructions 28 stored on the computer-readable medium 26 effective to determine one or more models of baseline data in association with the digital data files and compare the baseline data to the digital data files for purposes of determining a status of operation. The processor 28 may still further execute software instructions 28 stored on the computer-readable medium 26 effective to identify variations between the digital sound data stored in the database 32 and the selected comparative baseline data and associate said variations with one or more types of failure or substandard operation of the electromechanical device 12.

In further embodiments, the processor 28 may execute software instructions 28 stored on the computer-readable medium 26 effective to create, adjust, or modify baseline data in association with one or more modes of operation and store the modified baseline data in the database 32. In an exemplary embodiment, the processor 28 may execute software instructions 28 effective to determine model baseline data in accordance with digital sound files associated with one or more types of electromechanical devices such that, for a plurality of electromechanical devices 12 one or more modes of operation are determined. In a further exemplary embodiment, the software instructions 28 may be effective to determine model sound data associated with the suboptimal performance or failure of one or more components in the electromechanical device 12 in accordance with a plurality of digital sound files received over a period of time, such that received sound data files of a certain type may be compared against various models to predict the state of operation and rate of degradation of the electromechanical device 12 or its constituent components.

In certain embodiments, the processor 30 may execute software instructions 28 effective to generate an alert when comparisons indicate a certain mode of operation. The alert may indicate failure, substandard operation, potential failure conditions, and other suboptimal operational modes. In further embodiments, the alert may comprise a diagnostic warning and one or more proposed solutions for curing the suboptimal operational mode.

In certain embodiments, the processor 30 may send an alert across the communications network 22 to an endpoint device 38 associated with a monitoring user. The communications network 22 implemented may be the same as that for the sound detection device 12, or may comprise a partially or entirely different network. An endpoint device processor 34 may be effective to receive the alert from the communications network 22 and display the alert within a user interface generated on a display device 36 associated with the endpoint device 38. Certain embodiments of the endpoint device 38 may include, for example, a personal computer, a smart phone, a tablet computer, a specialized diagnostic device, a control module for the electromechanical device, and the like. In an embodiment, the endpoint device 38 and sound detection device 14 may be the same or otherwise operatively or communicatively connected, such that the display of the alert may occur on or via the sound detection device 14, the monitoring user being the sound technician operating the sound detection device 14.

In further embodiments, the endpoint device 38 may execute computer program instructions upon user initiation to generate a user interface including dashboards and associated program tools for purposes of entering equipment information, selecting listed options and/or displaying the generated alert. In embodiments where the endpoint device 38 and the sound detection device 14 are the same or otherwise operatively or communicatively connected, the user interface and dashboards may be populated upon the display with respect to one or more additional user interfaces pertaining to the operation of the sound detection device 14. For example, alerts, dashboards, or tools generated may provide further instruction as to the operation of the sound detection device 14, such as placing or resituating the sound detection cup 16 at a specific point proximate the electromechanical device 12 to confirm an operative state.

The term "user interface" as used herein may, unless otherwise stated, include any input-output module by which a user device facilitates user interaction with respect to at least the hosted server including, but not limited to, web browsers; hosted SDK-implemented mobile applications; web portals, such as individual web pages or those collectively defining a hosted website; telephony interfaces such as interactive voice response (IVR); and the like. Such interfaces may in a broader sense include pop-ups or links to third party websites for the purpose of further accessing and/or integrating associated materials, data, or program functions via the hosted system and in accordance with methods of the present invention. A user interface may further be described with respect to a sound detection device or personal mobile computing device in the context of buttons and display portions which may be independently arranged or otherwise interrelated with respect to, for example, a touch screen, and may further include audio and/or visual input/output functionality even without explicit user interactivity.

Figure 6:
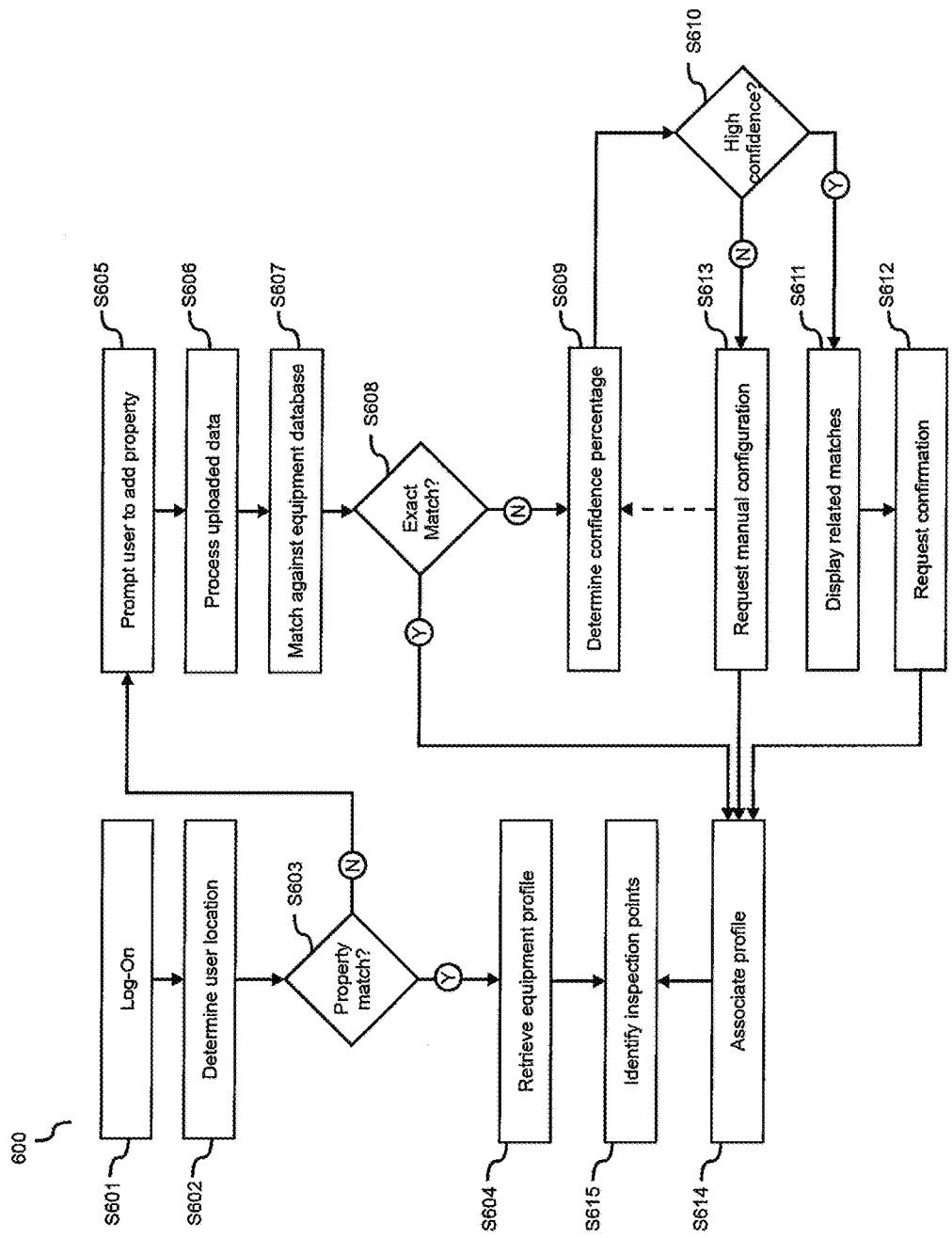
FIG. 6 is a flowchart representing an exemplary embodiment of a method for determining an associative equipment profile for client equipment in accordance with embodiments of the present disclosure.

Referring now to FIG. 6, an embodiment of a method for programmatically determining an equipment profile for a client electromechanical device may be described in association with the system represented in FIG. 1.

The exemplary method 600 may begin at a first step S601 when a user logs into a user interface (e.g., website) generated by or in association with a host program for technical diagnosis of client electromechanical devices via a portable sound detection device. The host program may determine the user's location via sensory data and/or telemetry data (e.g. GPS) (S602). In an embodiment, where the program is unable to determine the user's location initially, it may request the user input the user's location manually or may request entry of other locational data, such as scanning or otherwise capturing a QR Code or other such label containing location-specific information.

Upon determining the user's location, the host program determines whether the location is a known property in the system database, e.g., if the property owner/client is an existing customer (property data present) or a new customer (no property data present). If the property is known, then the host program retrieves one or more equipment profiles associated with the determined property (S604) and identifies client electromechanical equipment inspection points for the technician user to monitor (S615).

If the property is not known, then the host program and other system components effectively seek to generate a configuration for the "new" property and associated equipment, including auto-configuration of inspection points for the equipment as based on predetermined inspection points for analogous equipment in the database network, and further potentially including auto-generation of useful information such as product data sheets or manuals for onsite user support. The host program prompts the technician user to add property data and client electromechanical device information in accordance with the known location (S605). In an embodiment, the technician user may upload a photograph of a serial number and/or make and model listing for the client electromechanical device on site. The host program processes the uploaded data and information, such as for example extracting make and model information from a photograph of a product serial number sticker (S606), and attempts to match the information against an equipment database to determine if the electromechanical device has or may directly be associated with a known configuration (S607).

The host program determines if the extracted information pertains to an exact match for a known equipment profile or configuration, such as for example having an identical make/model number sequence (S608). If the electromechanical device matches exactly to a known equipment profile, then the host program associates the equipment profile to the client electromechanical device and location and stores this profile in the database (S614). In an embodiment, associated profiles may be further edited by technician users or other users, such as to reflect a modification or update to equipment at a specific property.

If the match is not exact, the host program then determines a confidence percentage for the match as compared to the known equipment profiles (S609). In an embodiment, the host program may query public and private information such as product specifications to determine segments or groupings of model number codes and determine relevance therefrom. For example, for an equipment make/model of "XYZ ABC109-0314-C-11449," the program may determine from stored information therefrom that the make is "XYZ," that the model is an "ABC" system, that the grouping "109" corresponds to a January 2009 date of manufacture, that the product includes a furnace heater by the "C" designation, that the product serial number is 11449, and that the paint color ("0314") is matte black. Other designations commonly referred to, especially for HVAC units, may include type, refrigerant type, tonnage, voltage, compressor series, SEER rating, manufacturing year/month/week/day, manufacturing plant location, etc.

The system may weigh certain determined variables greater than others when determining confidence levels (i.e., as may be expressed in the form of a percentage), such as make, model, type, proximity of serial number, as opposed to for example variables associated with segments or codes having a lesser influence on confidence levels such as paint color or manufacturing location. The system may further consider alternative weightings not only with respect to certain individually determined variables, but certain sets of variables associated with a particular grouping of segments or codes. For example, a first variable for a first segment may convey a meaningful correlation with respect to a first variable for a second segment, whereas an alternative set of variables for those respective segments may convey a less meaningful or even irrelevant correlation.

As a particular example, a plurality of equipment configurations may be stored in the hosted database or in association therewith, that have already been defined and that match a given model number nomenclature. The host program may extrapolate from the plurality of stored equipment configurations and recommend a configuration for this new model number on a new property setup, based on a confidence level or range therefor. Certain groups of the nomenclature are recognized as relatively insignificant, for instance, with regards to configuration. The digits in these insignificant groups can vary with respect to an input model number without impacting a confidence level for the suggested configuration. In other words, the system may be 100% confident in a suggested configuration because of the fact that, for instance, a particular segment or grouping of codes/digits (e.g., pertaining to Paint Color), does not alter the configuration setup of this type of equipment. If the system identifies preconfigured equipment matching only four out of five "significant" nomenclature groups, the host program may determine an 80% confident level in those matches for configuration recommendation. In addition to specifying model number nomenclature group insignificance to match previously configured equipment, the system can also recommend configurations based on product family and category matches (although these recommendations may generally have a lower percent confidence than model number nomenclature matches). As previously noted, nomenclature segment or group insignificance may be defined manually, at least initially, but further may be derived iteratively in view of compiled, aggregated and processed information from the data network.

The confidence percentage may generally correspond to a determined similarity between the present electromechanical device and a particular equipment profile, wherein substantially similar device configurations or device configurations which may produce substantially similar baseline sound data for operative states may have a higher confidence percentage in match than those which are substantially different.

For each compared equipment profile, the host program determines whether the confidence percentage exceeds a particular confidence threshold (S610). If the confidence threshold for a match exceeds the threshold, then the host program presents the technician user with one or more related matches (S611) and further requests the user to confirm the match (S612). In an embodiment, the host program may provide the user with a list of selectable profile matches sorted by confidence ratio. In another embodiment, the host program may provide the user with an expected match based on highest confidence percentage and request confirmation of that match. In various embodiments, the user may be able to make edits to the profile prior to confirming or prior to association of the profile with the electromechanical device and property (S614).

If no equipment profile results in a confidence percentage exceeding the threshold value, then the host program requests that the user manually input the electromechanical equipment configuration (S613). In an embodiment, the host program may repeat steps S609 and S610 continuously as the user enters the data so as to determine if a confident match can be determined therefrom.

Upon determination of a matched equipment profile, the host program associates the equipment profile with the electromechanical device and property (S614) and identifies inspection points for the technician user therefrom (S615), enabling the user to diagnose the device via systems and methods disclosed herein in accordance with the closest matched or identically matched profile information.

Figure 2:
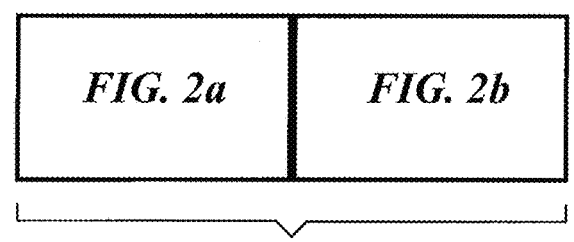
FIGS. 2a and 2b are a flowchart representing an exemplary embodiment of a diagnostic method for comparative analysis of sound data according to the present disclosure.
Figure 2A:
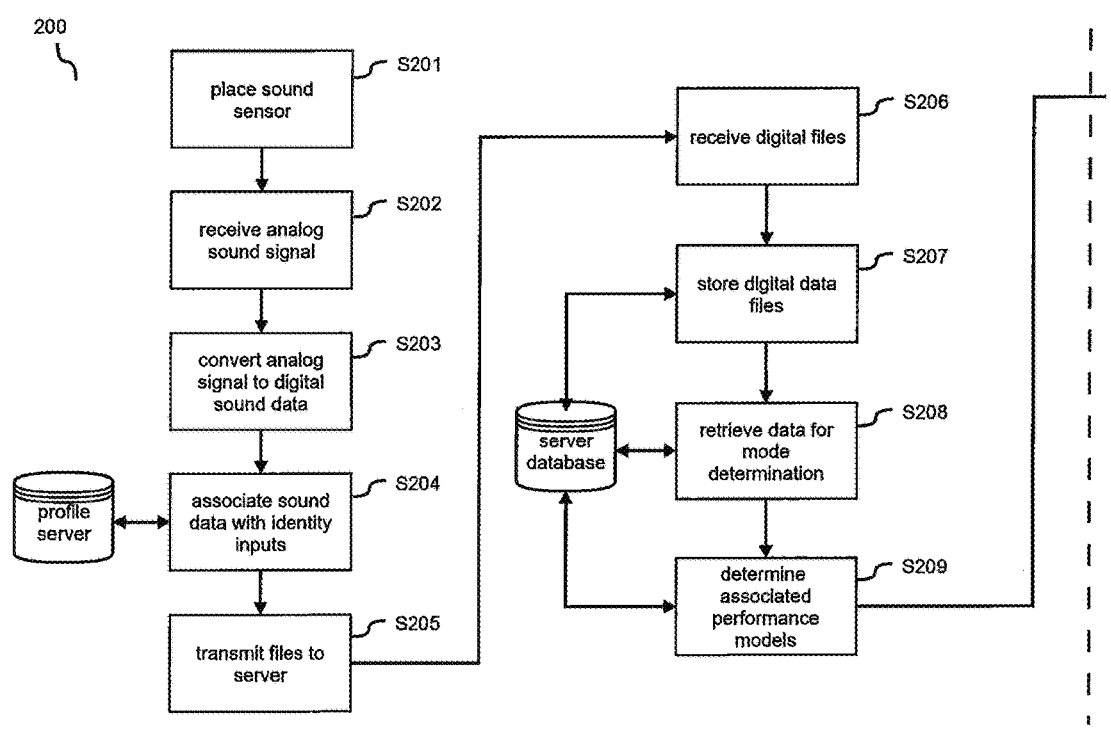
Figure 2B:
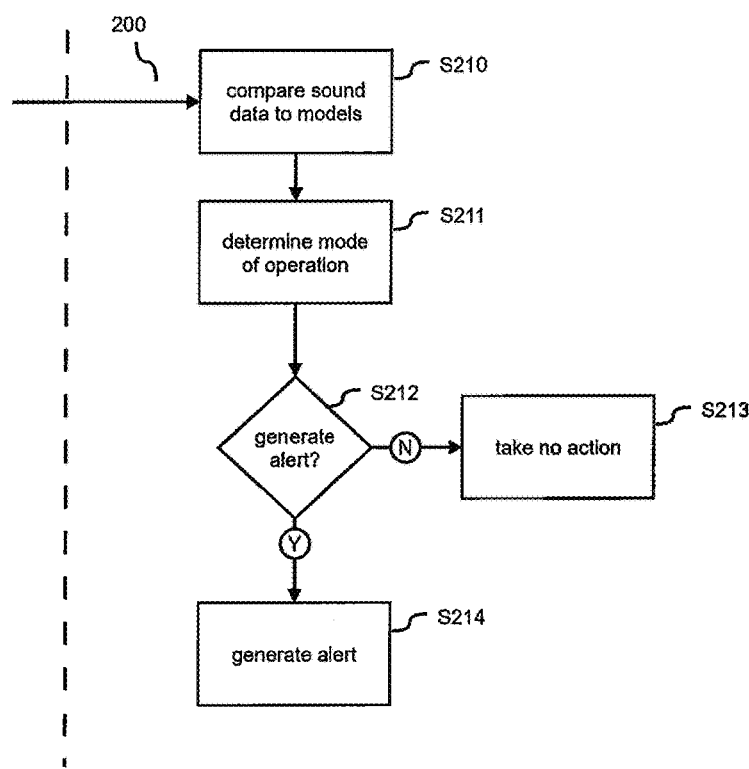

After a piece of equipment has been appropriately configured, a user can collect sound data from the equipment, and have a condition for that new piece of equipment comparatively evaluated against the database network with respect to similar equipment, wherein the hosted system may immediately derive a statistically calculated analysis of its condition. Referring now to FIGS. 2a and 2b, an embodiment of a method for comparative analysis of sound data associated with the operation of an electromechanical device may be described in association with embodiments of the system as represented in FIG. 1.

Steps S201 to S205 refer generally to a method for receiving and transmitting sound data to a server in accordance with electromechanical device inspection points, such as may be determined in accordance with step S615 of method 600 described herein.

The method 200 begins at a first step S201 when a technician user places a sound sensor, such as a sound detection cup, of a sound detection device proximate to a client electromechanical device in accordance with placement instructions determined for the client electromechanical device. The determination of placement instructions may in various embodiments be made in accordance with a client equipment profile determined in association with the client electromechanical device and identification of inspection points thereof, such as in accordance with steps S604, S614, and S615 of method 600 as described herein. In step S202, the sound detection device receives analog sound signals associated with the operation of an electromechanical device relative to the placement of the sound sensor with respect to the electromechanical device. In step S203, the sound detection device converts the analog sound signal to digital sound data. In certain embodiments, the analog-to-digital conversion may be achieved by means of one or more transducers.

In step S204, the sound detection device associates the digital sound data with client profile identity inputs pertaining at least to the client equipment profile and the placement of the sound sensor relative to the client electromechanical device and generates digital data files in association with the placement iteration. For example, a server may have provided the user instructions to place the sound sensor at a first inspection point relative to the client electromechanical device and in accordance with the client equipment profile, whereby the sound data obtained from the electromechanical device at that placement location would be associated with a unique identity for that sound location as instructed. As an alternative example, the server may provide the user the option of selecting one of a plurality of points relative to the client electromechanical device in accordance with the client equipment profile, whereby the sound data obtained from the user electromechanical device would be associated with a unique identity for that sound location only upon confirmation of the point chosen by the user, such as selection of a specific point via a user interface in association with the device.

In step S205, the sound detection device transmits the one or more digital data files to a server across a communications network. In various embodiments, transmission may be real-time for each placement iteration, may occur after the conclusion of a placement iteration, or may occur after a plurality of iterations such as a complete electromechanical device diagnostic.

Steps S206 to S211 refer generally to a method for comparing received sound data to model data for purposes of detecting suboptimal electromechanical device performance.

In step S206, the server receives the one or more digital data files from the sound detection device. In certain embodiments, the server may be configured to receive files from a plurality of sound detection devices in association with one or more electromechanical devices. The server then stores the received digital data files in one or more databases in association with the respective client equipment profile for the client equipment device (S207). In an embodiment, the digital data files may be stored in accordance with identity states of the client equipment profile, such that each sound file is stored in accordance with respective detection points. In an embodiment, a user may be able to define new identity states and detection points for a client equipment profile, wherein the server thereafter stores the digital data files for the new identity states in association with the newly defined detection points.

In step S208, the server retrieves the digital sound data associated with a client equipment profile for purposes of determining one or more modes of operation for the client electromechanical device. In certain embodiments, the server may retrieve a plurality of digital sound data, such as, for example, the sound data received from all sound detection devices installed in an electromechanical device, or a period of historical sound data generated by a single sound detection device.

Digital sound data may be further delineated on the basis of respective identity states for each detection point in association with the client equipment profile, such that each received digital data file and the digital sound data thereof may be compared individually against one or more retrieved digital sound data respective to that identity state, thereby permitting comparison of like-to-like data. In various embodiments, the server may determine in absence of identical identity states to retrieve substantially digital sound files from substantially similar identity states. For example, the server may determine in the absence of prior digital sound data history to query digital sound data from a different equipment profile wherein the alternate equipment profile is substantially similar to the present client equipment profile. As a more specific example, where a technician user is performing a diagnostic on new client equipment for which no historical data exists, such as for a new model, the server may retrieve a profile determined to be substantially similar, such as an immediately preceding model, or alternatively an equipment profile for a similarly configured electromechanical device.

The server then determines one or more associated performance models against which to compare the digital sound data of the retrieved sound files (S209). In certain embodiments, the performance models may be preconfigured in association with operative modes of performance for a particular electromechanical device. For example, the server may be configured to retrieve models associated with various modes of general performance for an electromechanical device of a certain type, make, or model. In further embodiments, the server may be configured to retrieve models associated with the failure or suboptimal performance of specific components within the electromechanical device. In still further embodiments, the server may generate performance models from analysis of historical trend data determined from the electromechanical device or one or more other mechanical devices of similar type, make, model, and/or configuration.

In step S210, the server compares the retrieved digital sound data with the determined performance models. In certain embodiments, the server may optionally perform certain transformations to the digital sound data to effect a better comparison, such as, for example, reducing noise, applying filters, removing data point outliers, amplifying the signal, and the like. In an embodiment, the server may compare the digital sound data to a series of performance models to find matched similarities indicating mode of operation. In an alternative embodiment, the server may compare the digital sound data to one or more performance models to determine identifiable differences indicating a mode of operation. From the comparison, the system determines a mode of operation for the electromechanical device (S211). In various embodiments, the comparison and determination of the mode of operation for the electromechanical device may be interpolated based upon a determined degree of confidence in the match between the mechanical device configuration and the comparative performance model. For example, the server may determine a mode of operation with a high degree of confidence where the performance models are derived from extensive historical data associated with the client equipment profile for the mechanical device, but determine a mode of operation with a low degree of confidence where the performance models are derived from other equipment profiles with similar but different equipment configurations.

Steps S212 to S214 refer generally to a method for generating an alert effective to notify a user of suboptimal operation of the electromechanical device.

On determination of a mode of operation in accordance with step S211, the server then determines from the diagnosed mode of operation whether an alert should be generated (S212). In certain embodiments, certain modes of operation may be pre-associated with alert generation. For example, certain modes of operation associated with the failure of certain components within the electromechanical device may be associated with alert statuses. In alternative embodiments, the server may determine whether to generate an alert based upon one or more predictive analysis models, such as predicting the failure of a device component from a history of sound data.

If the server determines that no alert should be generated, the system returns to its default monitoring state without taking further action (S213). Alternatively, if the server determines that an alert should be generated, it instead proceeds to step S214 and generates an alert to notify an end-user as to the status of the electromechanical device. In preferred embodiments, the server may include with the alert diagnostic information, follow-up diagnostic actions, and/or proposed corrective actions. In certain embodiments, the server may send the alert to an endpoint device associated with the technician user, including for example a computer display on the sound detection device.

Figure 3:
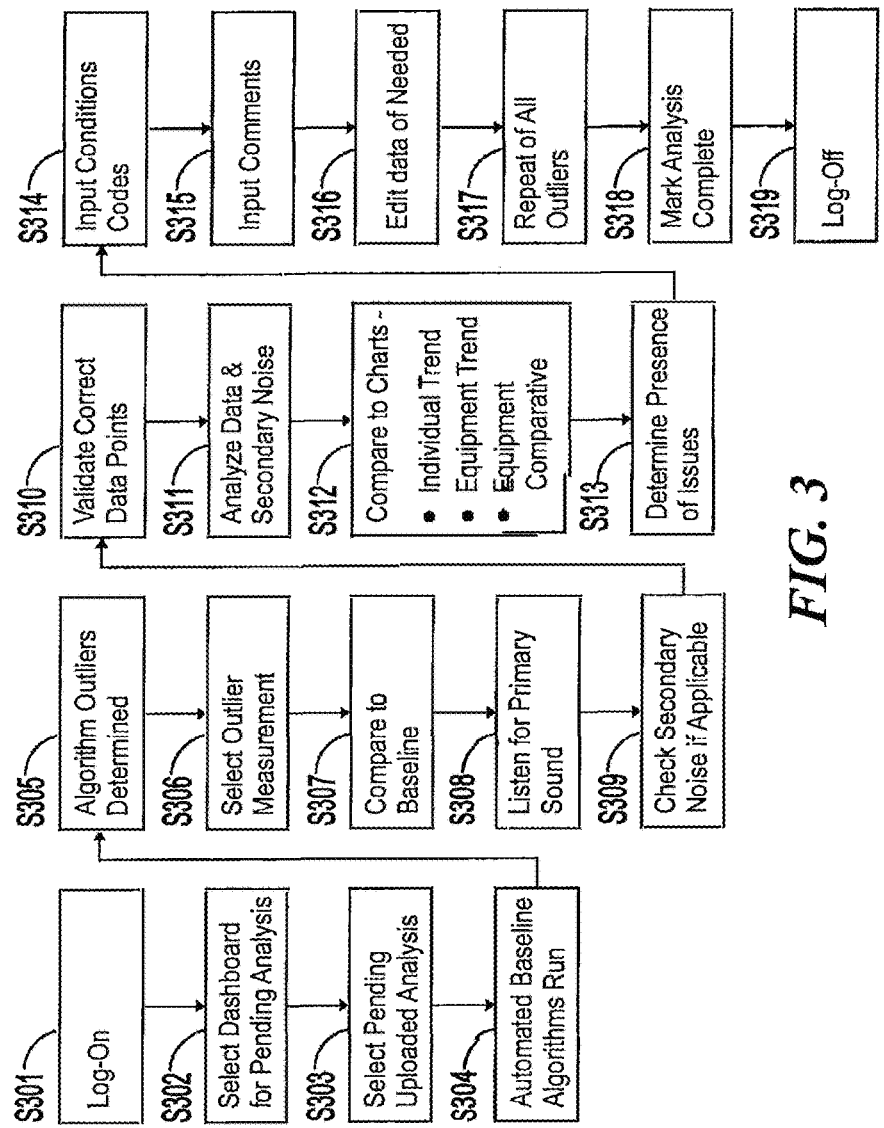
FIG. 3 is a flowchart representing an exemplary data analysis process in accordance with embodiments of the present disclosure.

Referring now to FIG. 3, an exemplary process may be described whereby a technician associated with a program partner (or for example a technician or administrator associated with the host) in accordance with systems, methods and algorithms as disclosed herein may perform analysis the surveyed sound files with respect to a particular customer, property or electromechanical device, and in various embodiments further with respect to historical and aggregated data with respect to a number of customers, properties and electromechanical devices.

The technician begins the diagnostic process by logging in to a user interface (e.g., website) generated by or in association with the host program (S301) which enables selection of a dashboard configured for pending analysis (S302), and further enables the selection of any one of a number of pending analyses (S303). The technician may implement program tools and back-end algorithms to for example identify or determine baseline data associated with the electromechanical device, and/or inspection point (S304), and further to identify or determine any outliers in the sound data with respect to the data itself or historical data associated therewith, and irrespective of the baseline (S305).

Program tools further may enable the technician to select a particular outlier measurement (S306) and perform a comparative analysis with respect to the identified or determined baseline (S307).

Program tools further may enable the technician to select sound files associated with the selected analysis and listen for primary sound (S308), check for the presence and/or effect of secondary noise where applicable (S309), and validate that the associated data points are correct (S310).

Comparative analysis tools may be provided by the system to enable the technician to analyze the sound data and secondary noise (S311) by way of direct review and analysis of the individual data points or by way of visual comparison via charts, graphs, etc., representing an individual trend, electromechanical device trend, device comparisons with respect to historical or aggregated data for related electromechanical devices stored in the system, etc. (S312). Using any or all of the above tools, or others as may be known in the art and further provided within the scope of the present invention, the technician may determine the presence of issues with respect to the electromechanical device in question (S313) and input condition codes (S314) and/or comments (S315) in association with the equipment. Such input may be in the form of line items in an equipment profile as may be displayed upon later request with respect to that piece of equipment, or as may take the form of tags or an equivalent that may be searchable by a user with respect to such conditions or comments generally. The technician may edit data as needed or desired (S316).

The process steps S306-S316 may then be repeated (S317) for all outliers having been determined by the system algorithms in step S305, and the technician may subsequently or otherwise mark the analysis as complete (S318). The process steps S303-S318 may likewise be repeated for all uploaded analyses as may be pending. The technician may otherwise log off from the user interface/website/program (S319).

Figure 4:
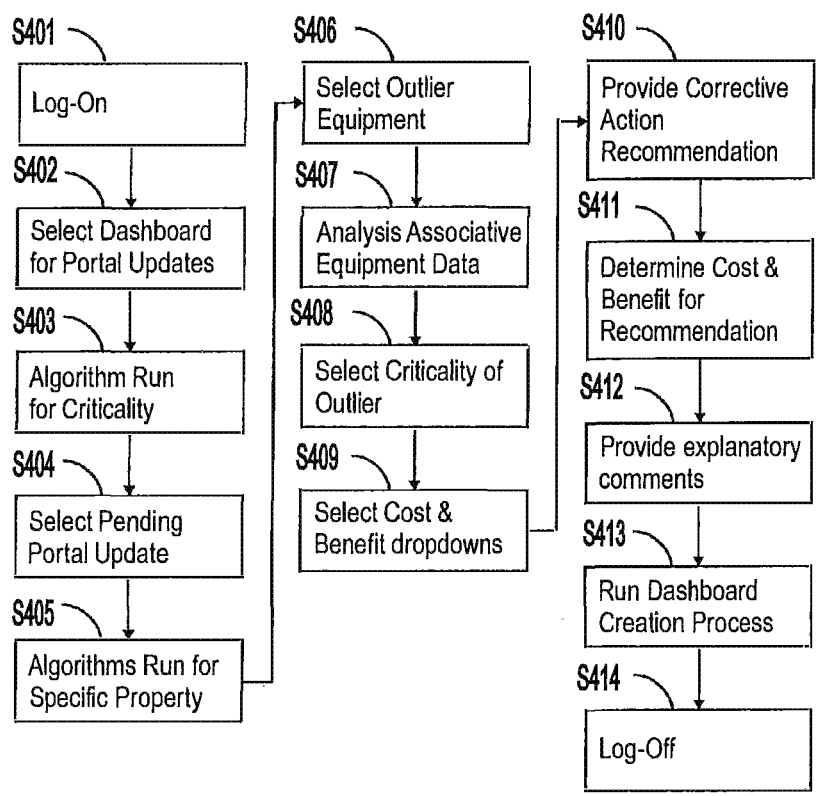
FIG. 4 is a flowchart representing an exemplary user interface process for analyzing critical data and providing recommendations in accordance with embodiments of the present disclosure.

Referring now to FIG. 4, an exemplary process may be described whereby an entity such as a program partner in accordance with the present invention may identify critical data based on results from one or more of the above-referenced processes, and perform cost-benefit analyses with respect to maintenance or potential corrective actions.

The technician begins by logging in to a user interface (e.g., website) generated by or in association with the host program (S401) which enables selection of a dashboard configured for portal updates (S402). The technician may implement program tools and back-end algorithms to generate system updates with respect to equipment and/or inspection points and further assess the criticality of results from the previous analyses (S403). Program tools enable the technician to select one from a list of pending portal updates (S404), and execute algorithms to identify and assess critical data points with respect to a specific associated property (S405). In an embodiment, the determination of the specific associated property and data points thereof may be performed in accordance with method 600 described herein. The program tools further enable the technician to select outlier equipment with respect to the property, or alternatively from a searchable list of equipment with respect to other key parameters or criteria (S406), and execute algorithms to analyze the associated equipment data (S407). In an alternative aspect of step S406, the system may determine, store, and provide the outlier equipment in accordance with the client equipment profile associated with the specific property.

The technician may be enabled by the system to select, determine or define a criticality of the selected outlier equipment (S408). The dashboard may in various embodiments include a cost-benefit drop down menu, hyperlinks, or some equivalent that is selectable by the user (S409). The technician may provide a corrective action recommendation (S410), and determine the costs and benefits for the provided recommendation by executing appropriate algorithms from the system (S411). As needed or desired, the technician may provide explanatory comments with respect to the provided recommendation and associated cost-benefit analysis (S412), and execute a dashboard creation process that may for example assemble or modify the customer dashboard based on the results generated in this and previously recited processes of the present invention (S413).

Figure 5:
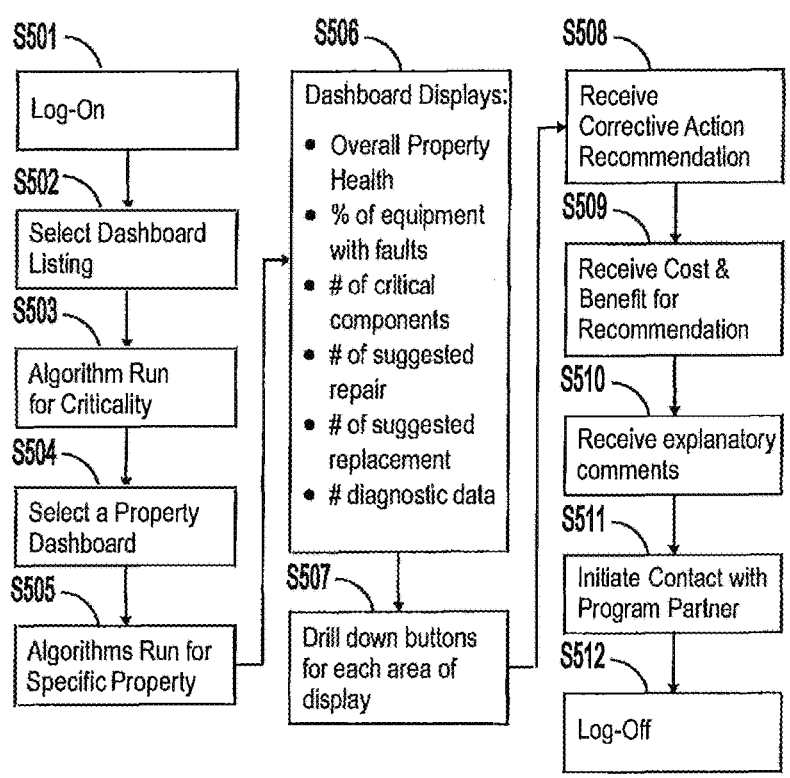
FIG. 5 is a flowchart representing an exemplary user interface process for receiving, reviewing and filtering results in accordance with embodiments of the present disclosure.

Referring now to FIG. 5, an exemplary process may be described whereby an entity such as a customer in accordance with the present invention may review results generated by the algorithms and program tools.

The customer begins by logging in to a user interface (e.g., website) generated by or in association with the host program (S501) which enables selection of any one of a number of available dashboards for that customer (S502). The customer may implement program tools and back-end algorithms to generate any critical system updates (S503). Program tools enable the customers to confirm a selected property from a list of properties or define a new property (S504), and execute algorithms to generate results for that property and accordingly populate a template for that dashboard with the appropriate results data (S505). Exemplary dashboard displays may include without limitation an overall property health value (which may be for example an assigned value such as "good" or may be a continuous variable as generated using appropriate algorithms and underlying component values); a percentage of equipment with faults; a current number of critical components; a current number of suggested repairs; a current number of suggested replacements; historical values for any of the above; any fixed diagnostic data values and/or diagnostic data variables as may be determined from any of the above (S506).

In various embodiments, the dashboard may be configured to include drill down buttons for each area of display (S507) such that the system may simply expand and display previously hidden data, or may alternatively further provide decision support capabilities such as for example online analytical processing (OLAP) such that the above-referenced values and variables may be analyzed with respect to a number of dimensions (e.g., time, location, technician).

The customer may be enabled by the system to receive (directly or by user selection) a corrective action recommendation as previously provided from a technician (S508), and to review an associated cost-benefit analysis for that recommendation (S509) and any explanatory comments from the technician (S510). If for example the customer elects to conduct further maintenance or other preventative action, the customer may be enabled by the system to directly initiate contact with the program partner or the host itself (S511), or alternatively to simply log off from the system (S512).

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "communications network" as used herein with respect to data communication or exchange between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISPs), and intermediate communication interfaces.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for remote configuration of client equipment and comparative analysis of sound data obtained therefrom, the system comprising:
    a sound detection device comprising one or more transducers effective to collect analog sound signals from equipment and convert the collected sounds into digital sound data, the device further effective to generate one or more digital data files comprising at least the sound data;
    a server associated with one or more databases and linked to the sound detection device via a communications network, wherein the server is configured to:
        obtain configuration data corresponding to electromechanical equipment at a first location, from an endpoint device proximate thereto,
        determine a confidence level of a match for the configuration data relative to any one or more of a plurality of types of electromechanical equipment having associated sound data files stored in the one or more databases,
        for determined confidence levels exceeding a predetermined threshold value, to associate the electromechanical equipment at the first location with a selected one of the plurality of types of electromechanical equipment, and identifying one or more predetermined sound inspection positions associated with the selected one of the plurality of types of electromechanical equipment,
        convey the identified one or more predetermined sound inspection positions to the endpoint device,
        receive digital data files from the sound detection device, said digital data files corresponding to analog sound signals collected from the one or more predetermined sound inspection positions, and
        identify data points from the digital data files representative of an electromechanical equipment failure.

2. The system of claim 1, wherein the server is configured to determine the confidence level based on a determined relevance of identified segments or groupings of model number codes resident in the obtained configuration data corresponding to the electromechanical equipment.

3. The system of claim 2, wherein the server is configured to determine the confidence level further based on a relative weight of variables for one or more of the identified segments or groupings of model number codes resident in the obtained configuration data, and having historical significance with respect to baseline sound data similarities.

4. The system of claim 3, wherein the database comprises iteratively compiled relationships associated with a specific set of one or more variables for the one or more identified segments or groupings of model number codes resident in the obtained configuration data, and having historical significance in identifying one or more existing equipment configurations having baseline sound data similarities.

5. The system of claim 1, wherein the configuration data corresponding to the electromechanical equipment at the first location is obtained from the endpoint device in the form of a captured one or more images, wherein the server is configured to extract make and model information from the one or more images.

6. The system of claim 1, wherein the configuration data corresponding to the electromechanical equipment at the first location is obtained from a comparison of current geographic coordinates for the endpoint device with stored location data associated with electromechanical equipment in the one or more databases.

7. The system of claim 1, wherein the server is configured to generate a user interface on a display unit associated with the endpoint device that presents a list of selectable profile matches sorted by confidence level.

8. The system of claim 1, wherein the server is further configured to:
aggregate data associated with the received data files with previously stored and related data across a plurality of predetermined data parameters,
identify outlying data points with respect to the plurality of data points from the sound data, and
compare the sound data with baseline data determined according to baseline criteria comprising one or more of the equipment type, the location and the aggregated data.

9. The system of claim 8, wherein the baseline data is preconfigured in accordance with the electromechanical equipment type.

10. The system of claim 9, the processor further configured to aggregate the digital data files from a plurality of sound detection devices in accordance with the baseline criteria.

11. The system of claim 1, wherein the server is further configured to generate an alert effective to notify a user of the failure or substandard operation of the electromechanical device by transmitting the alert via the communications network to an endpoint device associated with an authorized user.

12. The system of claim 11, wherein the server is further configured to estimate a cost for maintenance of the electromechanical equipment based on identified data points from the sound data representative of equipment failure and expected equipment failure.

13. A system for remote configuration of client electromechanical equipment, the system comprising:
an endpoint device comprising a user interface and linked to a communications network;
a server associated with one or more databases and linked to the endpoint device via the communications network, wherein the server is configured to:
obtain data from the endpoint device corresponding to electromechanical equipment at a first location,
identify one or more segments or groupings of model number codes resident in the obtained data and having a historical significance with respect to identifying one or more existing equipment configurations having baseline sound data similarities;
determine a confidence level of a match for the electromechanical equipment relative to any one or more of a plurality of electromechanical equipment configurations having associated sound data files stored in the one or more databases,
for determined confidence levels exceeding a predetermined threshold value, to associate the electromechanical equipment with a selected one of the plurality of electromechanical equipment configurations, and identifying one or more predetermined sound inspection positions associated with the selected one of the plurality of electromechanical equipment configurations, and
convey the identified one or more predetermined sound inspection positions to the endpoint device.

14. The system of claim 13, wherein the server is configured to determine the confidence level based on a determined relevance of identified segments or groupings of model number codes resident in the obtained data corresponding to the electromechanical equipment.

15. The system of claim 14, wherein the server is configured to determine the confidence level further based on a relative weight of variables for one or more of the identified segments or groupings of model number codes resident in the obtained data, and having historical significance with respect to baseline sound data similarities.

16. The system of claim 15, wherein the database comprises iteratively compiled relationships associated with a specific set of one or more variables for the one or more identified segments or groupings of model number codes resident in the obtained data, and having historical significance in identifying one or more existing equipment configurations having baseline sound data similarities.

17. The system of claim 13, wherein the endpoint device comprises an imaging device, and the data corresponding to the electromechanical equipment at the first location is obtained from the endpoint device in the form of a captured one or more images, wherein the server is configured to extract make and model information from the one or more images.

18. The system of claim 13, wherein the endpoint device comprises one or more position sensors, and the data corresponding to the electromechanical equipment at the first location is obtained from a comparison of current geographic coordinates for the endpoint device with stored location data associated with electromechanical equipment in the one or more databases.

19. The system of claim 13, further comprising:
a sound detection device comprising one or more transducers effective to collect analog sound signals from equipment and convert the collected sounds into digital sound data, the device further effective to generate one or more digital data files comprising at least the sound data;
wherein the server is further configured to receive digital data files from the sound detection device via a communications network, said digital data files corresponding to analog sound signals collected from the one or more predetermined sound inspection positions, and to identify data points from the digital data files representative of an electromechanical equipment failure.

20. A system for remote configuration of client equipment and comparative analysis of sound data obtained therefrom, the system comprising:

a sound detection device comprising one or more transducers effective to collect analog sound signals from equipment and convert the collected sounds into digital sound data, the device further effective to generate one or more digital data files comprising at least the sound data;

an endpoint device comprising one or more position sensors, an imaging device, and a user interface;

a server associated with one or more databases and remotely linked to the sound detection device and the endpoint device via one or more communications networks, wherein the server is configured to:

obtain imaging data from the endpoint device corresponding to electromechanical equipment, and position data corresponding to a location of the electromechanical equipment, determine a configuration of the electromechanical equipment relative to any one or more of a plurality of types of electromechanical equipment having associated sound data files stored in the one or more databases, identify one or more predetermined sound inspection positions associated with the selected one of the plurality of types of electromechanical equipment, convey the identified one or more predetermined sound inspection positions to the endpoint device, receive digital data files from the sound detection device, said digital data files corresponding to analog sound signals collected from the one or more predetermined sound inspection positions, identify data points from the digital data files representative of an electromechanical equipment failure, generate an alert effective to notify a user of the failure or substandard operation of the electromechanical device by transmitting the alert to the endpoint device associated with an authorized user, and estimate a cost for maintenance of the electromechanical equipment based on identified data points from the sound data representative of equipment failure and expected equipment failure.

\* \* \* \* \*